US009318961B2

(12) United States Patent
Tadamasa et al.

(10) Patent No.: US 9,318,961 B2
(45) Date of Patent: Apr. 19, 2016

(54) SWITCHING POWER-SUPPLY DEVICE (71) Applicant: Sanken Electric Co., Ltd., Niiza-shi, Saitama (JP)

(72) Inventors: Yoshimichi Tadamasa, Niiza (JP); Masaaki Shimada, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 14/284,897

(22) Filed: May 22, 2014

(65) Prior Publication Data
US 2014/0347895 A1    Nov. 27, 2014

(30) Foreign Application Priority Data

May 22, 2013    (JP) .................................. 2013-107620

(51) Int. Cl.
*H02M 3/335*    (2006.01)
*H02M 1/00*    (2007.01)

(52) U.S. Cl.
CPC ...... *H02M 3/33507* (2013.01); *H02M 3/33523* (2013.01); *H02M 2001/0025* (2013.01); *H02M 2001/0035* (2013.01); *Y02B 70/16* (2013.01)

(58) Field of Classification Search
CPC ................ H02M 3/33523; H02M 2001/0035; H02M 3/33507
See application file for complete search history.

(56) References Cited

U.S. PATENT DOCUMENTS

| | | | | |
|---|---|---|---|---|
| 2008/0130324 | A1* | 6/2008 | Choi ................ | H02M 3/33507 363/21.03 |
| 2008/0231207 | A1* | 9/2008 | Kimura .................. | H05B 41/28 315/276 |
| 2010/0008109 | A1 | 1/2010 | Morota | |
| 2010/0188874 | A1* | 7/2010 | Sato .................... | H02M 1/4225 363/21.18 |
| 2010/0321956 | A1* | 12/2010 | Yeh ................... | H02M 3/33507 363/16 |
| 2011/0110124 | A1* | 5/2011 | Basso ............... | H02M 3/33507 363/21.17 |

FOREIGN PATENT DOCUMENTS

JP    2010-022121 A    1/2010

* cited by examiner

*Primary Examiner* — Fred E Finch, III
*Assistant Examiner* — Rafael O. De Leon Domenech
(74) *Attorney, Agent, or Firm* — Banner & Witcoff, Ltd.

(57) ABSTRACT

A switching power-supply device includes a COMP-voltage comparator circuit that compares a COMP-voltage obtained by performing phase compensation on the feedback signal, with a first threshold voltage which is a threshold value; and an intermittent-oscillation control circuit that, if it is detected by the COMP-voltage comparator circuit that the COMP-voltage is lower than the first threshold voltage, stops the switching operation of the switching device and performs a transition to a first intermittent oscillation operation in which the switching device performs the switching operation every predetermined first period, wherein if a predetermined delay period elapses in a state where the COMP-voltage is lower than the first threshold voltage, the intermittent-oscillation control circuit performs a transition to a second intermittent oscillation operation in which the switching device performs the switching operation every second period which is an integral multiple of the first period.

6 Claims, 7 Drawing Sheets

SWITCHING POWER-SUPPLY DEVICE

CROSS-REFERENCE TO RELATED APPLICATION

This application claims priority from Japanese Patent Application No. 2013-107620 filed on May 22, 2013, the entire subject matter of which is incorporated herein by reference.

TECHNICAL FIELD

This disclosure relates to a switching power-supply device that controls an output voltage by a switching operation, and specifically to a primary-side regulated (PSR) switching power-supply device that indirectly controls an output voltage by controlling the voltage of a primary-side auxiliary winding.

BACKGROUND

There is a primary-side regulated switching power-supply device that receives a signal of a secondary winding of a transformer by an auxiliary winding provided on the primary side and controls an output voltage based on a voltage generated in the auxiliary winding (see JP-A-2010-22121, for instance).

SUMMARY

However, in the background art, when a switching operation is not performed, it is not possible to detect the output voltage by the voltage of the primary-side auxiliary winding. In other words, in an intermittent oscillation operation for low standby power during a light load or no load, it is possible to detect variation in the output voltage only when the switching operation is intermittently performed.

Therefore, in case that the oscillation cycle of the intermittent oscillation operation is long, even if a load suddenly increases while the switching operation is not performed, it is impossible to detect a decrease in the output voltage until the next switching operation. Therefore, the dynamic characteristic is sacrificed. In contrast, if the oscillation cycle of the intermittent oscillation operation is shortened in order to improve the dynamic characteristic, it is impossible to reduce switching loss during no load or a light load, and thus it is impossible to obtain an excellent standby characteristic.

In view of the above, this disclosure provides a switching power-supply device capable of obtaining an excellent standby characteristic without sacrificing a dynamic characteristic.

A switching power-supply device of this disclosure includes a transformer that includes a primary winding, a secondary winding, and an auxiliary winding; a switching device that is connected in series with the primary winding; an oscillation circuit that causes the switching device to perform a switching operation; an output voltage generating circuit that generates an output voltage based on a voltage generated in the secondary winding; a control-circuit power-supply voltage generating circuit that generates a control-circuit power-supply voltage based on a voltage generated in the auxiliary winding; and a feedback control circuit that uses a voltage generated in the auxiliary winding according to the switching operation of the switching device, as a feedback signal, to control the ON-width of the switching device. The switching power-supply device further includes: a COMP-voltage comparator circuit that compares a COMP-voltage obtained by performing phase compensation on the feedback signal, with a first threshold voltage which is a threshold value; and an intermittent-oscillation control circuit that, if it is detected by the COMP-voltage comparator circuit that the COMP-voltage is lower than the first threshold voltage, stops the switching operation of the switching device and performs a transition to a first intermittent oscillation operation in which the switching device performs the switching operation every predetermined first period, wherein if a predetermined delay period elapses in a state where the COMP-voltage is lower than the first threshold voltage, the intermittent-oscillation control circuit performs a transition to a second intermittent oscillation operation in which the switching device performs the switching operation every second period which is an integral multiple of the first period.

Further, the first intermittent oscillation operation and the second intermittent oscillation operation respectively may include an enforced oscillation period in which the switching device is controlled to perform the switching operation.

Further, when the transition to the second intermittent oscillation operation is performed, the intermittent-oscillation control circuit may switch the threshold value, which is compared with the COMP-voltage of the COMP-voltage comparator circuit, to a second threshold voltage higher than the first threshold voltage, and if it is detected by the COMP-voltage comparator circuit that the COMP-voltage is equal to or higher than the second threshold voltage, the intermittent-oscillation control circuit may perform a transition to a first intermittent oscillation operation and also switches the threshold value, which is compared with the COMP-voltage of the COMP-voltage comparator circuit, to the first threshold voltage.

According to this disclosure, since the second intermittent oscillation operation having a long intermittent cycle and the first intermittent oscillation operation having a short intermittent cycle are appropriately used for different purposes, it is possible to achieve an effect that it is possible to obtain an excellent standby characteristic, without sacrificing a dynamic characteristic.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
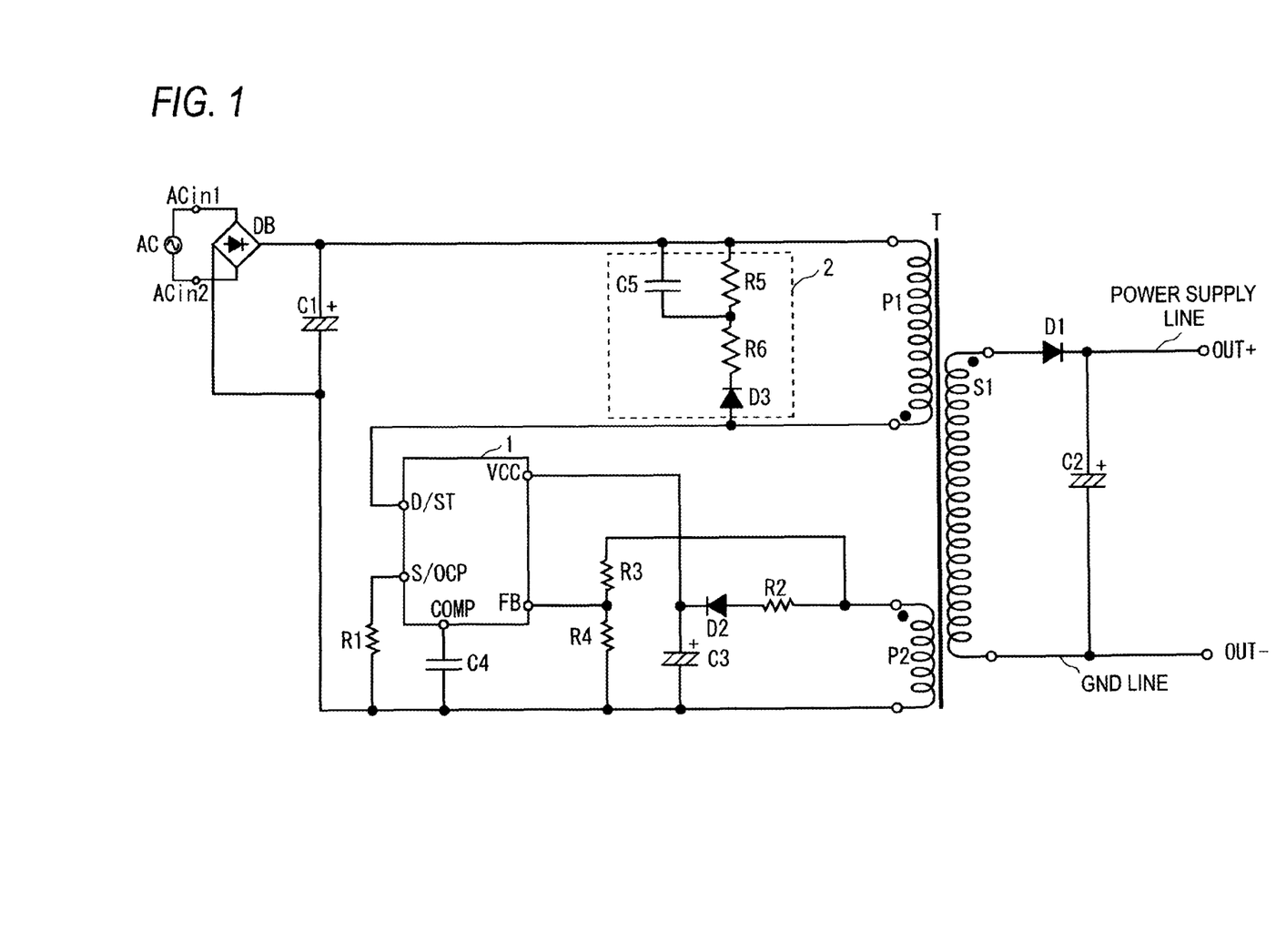
FIG. 1 is a circuit diagram illustrating a circuit configuration of an illustrative embodiment of a switching power-supply device according to this disclosure.

As shown in FIG. 1, a switching power-supply device of an illustrative embodiment includes a rectifier circuit DB, electrolytic capacitors C1, C2, and C3, transformer T, rectifier diodes D1 and D2, resistors R1 to R4, a capacitor C4, a control circuit 1 having a switching device built therein, and a snubber circuit 2.

An AC power supply supply AC is connected to the AC input terminals ACin1 and ACin2 of the rectifier circuit DB having a bridge configuration of diodes, and an AC voltage input from the AC power supply supply AC is full-wave rectified, and then it is output from the rectifier circuit DB. Between the positive rectified-output terminal and negative rectified-output terminal of the rectifier circuit DB, the electrolytic capacitor C1 is connected. As a result, AC power supply AC is rectified and smoothed by the rectifier circuit DB and the electrolytic capacitor C1, whereby DC power is obtained.

A transformer T includes a primary winding P1, a secondary winding S1, and an auxiliary winding P2, and the polarity of the primary winding P1 is set to be opposite to the polarities of the secondary winding S1 and the auxiliary winding P2. The primary winding P1 of the transformer T is connected between the positive terminal of the electrolytic capacitor C1 and the drain (D/ST) terminal of the control circuit 1 (the switching device). As a result, the rectified and smoothed DC power is applied as input power to the primary winding P1 of the transformer T. Also, the source (S/OCP) terminal of the control circuit 1 (the switching device) is connected to the negative terminal of the electrolytic capacitor C1 through the resistor R1.

The control circuit 1 is a circuit for performing switching control to cause the built-in switching device Q1 to oscillate (to be turned on and off). With referring to FIG. 2, the switching device Q1 is connected between the D/ST terminal and the S/OCP terminal. The switching device Q1 is composed of an N-type power metal oxide semiconductor field effect transistor (MOSFET), and the drain of the switching device Q1 is connected to the primary winding P1 of the transformer T through the D/ST terminal of the control circuit 1, and the source of the switching device Q1 is connected to the negative terminal of the electrolytic capacitor C1 through the S/OCP terminal of the control circuit 1 and the resistor R1. Therefore, the DC power (the input power) obtained by rectifying and smoothing the AC power supply AC by the rectifier circuit DB and the electrolytic capacitor C1 is output to the secondary winding S1 of the transformer T in OFF periods by an ON/OFF operation of the switching device Q1 connected through the primary winding P1 of the transformer T.

With referring to FIG. 1, between both terminals of the secondary winding S1 of the transformer T, the electrolytic capacitor C2 is connected through the rectifier diode D1, such that an AC voltage induced in the secondary winding S1 of the transformer T is rectified and smoothed by a secondary rectifying/smoothing circuit composed of the rectifier diode D1 and the electrolytic capacitor C2, and is supplied as a DC output voltage Vout to a load (not shown) connected between a positive output terminal OUT+ and a ground output terminal OUT−. That is, the rectifier diode D1 and the electrolytic capacitor C2 act as an output voltage generating circuit for generating the output voltage Vout based on the voltage generated in the secondary winding S1. Additionally, a line connected to the positive output terminal OUT+ becomes a power supply line, and a line connected to the ground output terminal OUT− becomes a GND line.

Between both terminals of the auxiliary winding P2 of the transformer T, the electrolytic capacitor C3 is connected through the resistor R2 and the rectifier diode D2, and the connection portion of the rectifier diode D2 and the electrolytic capacitor C3 is connected to a control-circuit power-supply voltage input (VCC) terminal of the control circuit 1. Therefore, the voltage generated in the auxiliary winding P2 is rectified and smoothed by the rectifier diode D2 and the electrolytic capacitor C3, and then it is supplied to the VCC terminal of the control circuit 1, and is used as a control-circuit power-supply voltage for driving the control circuit 1. That is, the rectifier diode D2 and the electrolytic capacitor C3 act as a control-circuit power-supply voltage generating circuit for generating the control-circuit power-supply voltage based on the voltage generated in the auxiliary winding P2.

Also, between both terminals of the auxiliary winding P2 of the transformer T, the resistor R3 and the resistor R4 are connected in series, and the connection portion of the resistor R3 and the resistor R4 is connected to a feedback (FB) terminal of the control circuit 1. Therefore, the AC voltage generated in the auxiliary winding P2 is divided by the resistor R3 and the resistor R4, whereby a voltage signal is obtained. The voltage signal is input as a secondary voltage detection signal $V_{FB}$ to the FB terminal of the control circuit 1. Also, the auxiliary winding P2 and the secondary winding S1 have the same polarity, and a pulse voltage to be generated in the auxiliary winding P2, and a pulse voltage to be generated in the secondary winding S1 are proportional to the numbers of turns of the windings. Therefore, the secondary voltage detection signal $V_{FB}$ to be input to the FB terminal of the control circuit 1 is proportional to the pulse voltage which is generated in the secondary winding S1.

The snubber circuit 2 is a protective circuit, which is connected between both terminals of the primary winding P1 of the transformer T and absorbs an transiently high voltage which is generated during cutoff of the switching device Q1. The snubber circuit 2 is composed of resistors R5 and R6, a diode D3, and a capacitor C5. Between both terminals of the primary winding P1 of the transformer T, the resistors R5, R6 and the diode D3 are connected in series, and the resistor R5 is connected in parallel to the capacitor C5. The diode D3 is connected in a direction in which the diode D3 is biased in a forward direction by a voltage which is generated in the primary winding P1 of the transformer T when the switching device Q1 is off.

Figure 2:
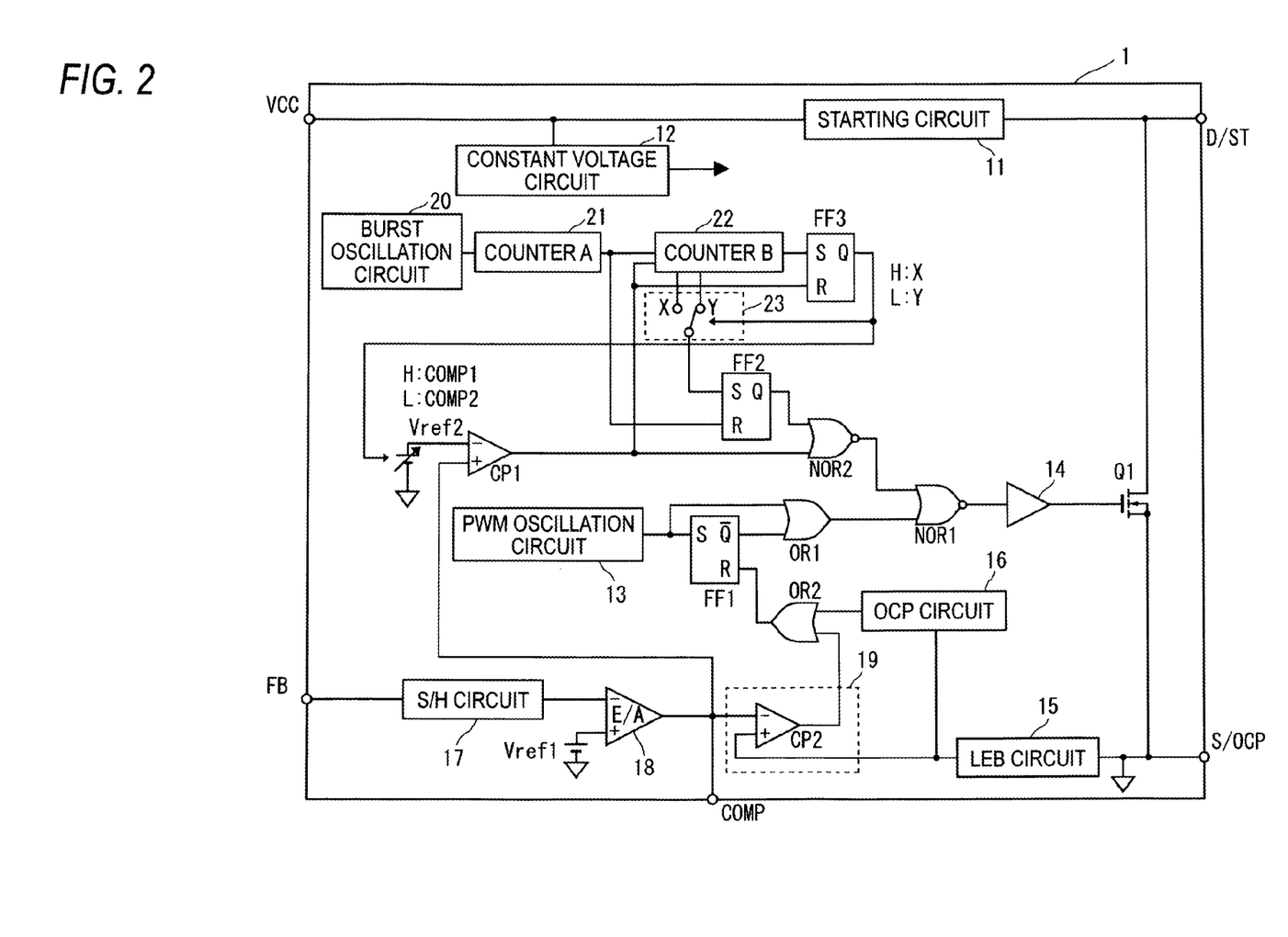
FIG. 2 is a circuit diagram illustrating a circuit configuration of a control circuit shown in FIG. 1.

The control circuit 1 uses the voltage of the VCC terminal (the voltage of the electrolytic capacitor C3) as a power supply voltage to generate a drive signal to be applied to the gate terminal of the switching device Q1, thereby controlling the switching operation of the switching device Q1. Referring to FIG. 2, the control circuit 1 includes the switching device Q1, a starting circuit 11, a constant voltage circuit 12, a PWM oscillation circuit 13, flip-flops FF1 to FF3, a drive circuit 14, a leading edge blanking (LEB) circuit 15, an over-current protection (OCP) circuit 16, OR circuits OR1 and OR2, NOR circuits NOR1 and NOR2, a sample and hold (S/H) circuit 17, an error amplifier 18, a reference voltage Vref1, a feedback (FB) control circuit 19, a comparator CP1, a variable voltage Vref2, a burst oscillation circuit 20, a counter A 21, and a counter B 22, and a switch 23.

The starting circuit 11 is connected between the D/ST terminal connected to the positive terminal of the electrolytic capacitor C1 and the VCC terminal connected to the positive terminal of the electrolytic capacitor C3. The starting circuit 11 is a constant current circuit, which operates during startup before switching control starts, so as to supply a constant current to the electrolytic capacitor C3 connected to the VCC terminal. Further, the starting circuit 11 stops supply of the current from the constant current circuit after startup of the control circuit 1. Also, the constant voltage circuit 12 converts the voltage of the electrolytic capacitor C3 into power supply voltages for operating respective units of the control circuit 1, and supplies the power supply voltages to the respective units.

Figure 3:
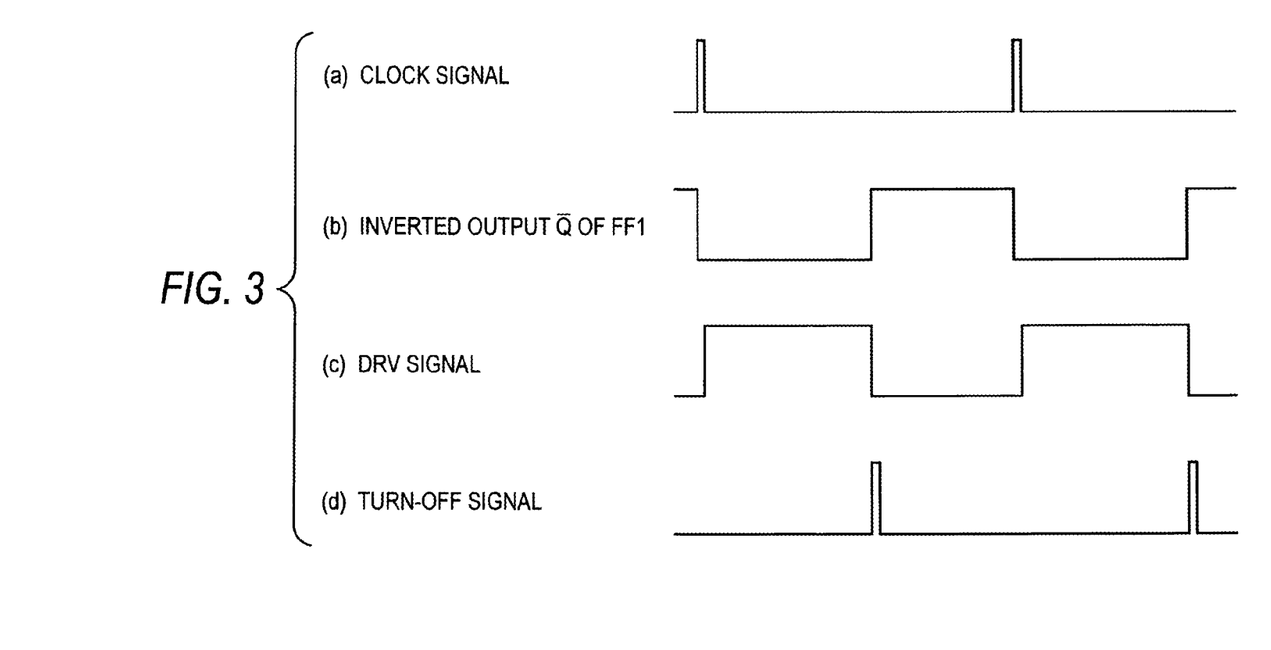
FIG. 3 is a chart illustrating signal waveforms and operation waveforms of an oscillation circuit for causing a switching device shown in FIG. 2 to perform a switching operation.

As shown in a chart (a) of FIG. 3, the PWM oscillation circuit 13 oscillates a PWM clock signal for causing the switching device Q1 to be turned on, in a predetermined cycle.

The PWM clock signal which is output from the PWM oscillation circuit 13 is input to a set terminal S of the flip-flop FF1 and is also input to one input terminal of the OR circuit OR1. Also, the inverted output $\overline{Q}$ of the flip-flop FF1 shown in a chart (b) of FIG. 3 is input to the other input terminal of the OR circuit OR1, and the output of the OR circuit OR1 is input to one input terminal of the NOR circuit NOR1. Further, the output of the NOR circuit NOR1 is input to the drive circuit 14 which outputs a drive (DRV) signal for driving the switching device Q1. Therefore, in a case where the other input of the NOR circuit NOR1 is at a low level, the drive (DRV) signal is generated based on the output of the OR circuit OR1, whereby the switching device Q1 is turned on at fallings of the clock signal as shown in a chart (c) of FIG. 3. That is, the PWM oscillation circuit 13, the flip-flop FF1, and the OR circuit OR1 act as an oscillation circuit for causing the switching device Q1 to perform a switching operation. Also, the other input terminal of the NOR circuit NOR1 is connected to the output terminal of the NOR circuit NOR2. Therefore, the output of the NOR circuit NOR2 becomes a mask signal for determining oscillation periods of the switching device Q1, such that the drive (DRV) signal is generated only when the output of the NOR circuit NOR2 is at a low level.

The resistor R1 connected to the S/OCP terminal is a current detecting circuit for detecting a drain current to flow in the switching device Q1, and an OCP voltage, which is generated on the connection point of the source of the switching device Q1 and the resistor R1, is input as a drain current detection signal to the LEB circuit 15.

The LEB circuit 15 is a circuit for invalidating (blanking) periods of the drain current detection signal when a surge voltage is generated during turn-off of the switching device Q1. The drain current detection signal is input to each of the OCP circuit 16 and the FB control circuit 19 through the LEB circuit 15.

The OCP circuit 16 compares the drain current detection signal with an over-current detection threshold voltage Vocp, and if the drain current detection signal, that is, if a drop in the voltage of the resistor R1 with respect to the voltage of the S/OCP terminal reaches the over-current detection threshold voltage Vocp, the OCP circuit 16 outputs an over-current detection signal. The over-current detection signal is input to a reset terminal R of the flip-flop FF1 through the OR circuit OR2, whereby a turn-off signal is output as shown in a chart (d) of FIG. 3 such that the switching device Q1 is turned off.

The S/H circuit 17 detects a falling of the secondary voltage detection signal $V_{FB}$ input to the FB terminal and holds the voltage immediately before the falling. The voltage held by the sample and hold (S/H) circuit 17 is input as a feedback signal according to the output voltage Vout to the inverted input terminal of the error amplifier 18. Also, the feedback signal held by the S/H circuit 17 is updated with a new feedback signal according to detection of the next falling of the secondary voltage detection signal $V_{FB}$.

The non-inverted input terminal of the error amplifier 18 receives the reference voltage Vref1. Therefore, from the output terminal of the error amplifier 18, an error amplification signal $V_{EAO}$ obtained by voltage/current conversion of a difference between the feedback signal held by the S/H circuit 17 and the reference voltage Vref1 is output. The output terminal of the error amplifier 18 is connected to a feedback phase compensation (COMP) terminal, where the capacitor C4 for phase compensation is connected to the capacitor C1, and the capacitor C4 is charged by the error amplification signal $V_{EAO}$, whereby phase compensation is performed.

The FB control circuit 19 includes a comparator CP2. The inverted input terminal and non-inverted input terminal of the comparator CP2 are connected to the COMP terminal and the output terminal of the LEB circuit 15, respectively, and the output terminal of the comparator CP2 is connected to the reset terminal R of the flip-flop FF1 through the OR circuit OR2. Therefore, the comparator CP2 compares the drain current detection signal blanked by the LEB circuit 15, with the voltage of the COMP terminal subjected to phase compensation (hereinafter, referred to as the COMP-voltage), and if the drain current detection signal exceeds the COMP-voltage, the comparator CP2 outputs a turn-off signal shown in a chart (d) of FIG. 3. The turn-off signal is input to the reset terminal R of the flip-flop FF1 through the OR circuit OR2, whereby the switching device Q1 is turned off as shown in a chart (c) of FIG. 3. That is, the FB control circuit 19 acts as a circuit for controlling the ON-width of the switching device Q1, based on the drain current detection signal and the COMP-voltage. As the output voltage Vout is lower and as the error amplification signal $V_{EAO}$ (the COMP-voltage) is higher, the ON-width lengthens.

Also, the COMP terminal is connected to the non-inverted input terminal of the comparator CP1, and the inverted input terminal of the comparator CP1 receives the variable voltage Vref2. The output of the comparator CP1 is input to one input terminal of the NOR circuit NOR2, and the output of the NOR circuit NOR2 is input to the other input terminal of the NOR circuit NOR1. Therefore, in a case where the COMP-voltage is equal to or higher than the variable voltage Vref2 and the output of the comparator CP1 is at a high level, the other input of the NOR circuit NOR1 becomes necessarily a low level. Therefore, the drive (DRV) signal is generated based on the output of the OR circuit OR1 which is one input of the NOR circuit NOR1.

Meanwhile, the other input terminal of the NOR circuit NOR2 is connected to the output terminal Q of the flip-flop FF2. Therefore, in a case where the COMP-voltage is lower than the variable voltage Vref2 and the output of the comparator CP1 is at the low level, only when the output Q of the flip-flop FF2 is at a high level, the other input of the NOR circuit NOR1 becomes the low level. Therefore, the drive (DRV) signal is generated based on the output of the OR circuit OR1 which is one input of the NOR circuit NOR1.

Figure 4:
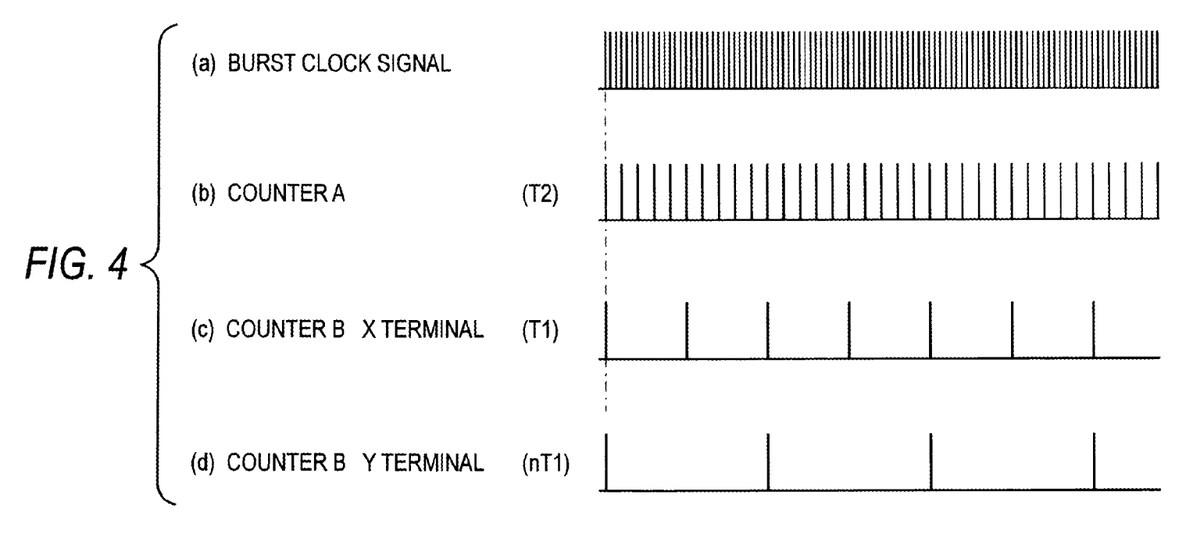
FIG. 4 is a chart illustrating signal waveforms and operation waveforms of an intermittent-oscillation control circuit for causing the switching device shown in FIG. 2 to intermittently oscillate.

The burst oscillation circuit 20 oscillates a burst clock signal in a predetermined cycle as shown in a chart (a) of FIG. 4. The burst clock signal is input to the counter A 21, and the counter A 21 counts the burst clock signal, thereby outputting a pulse signal every period T2 as shown in a chart (b) of FIG. 4. The pulse signal from the counter A 21 is input to the counter B 22, and is also input to the reset terminal R of the flip-flop FF2.

The counter B 22 counts the pulse signal input from the counter A 21, thereby outputting a pulse signal as shown in a chart (c) of FIG. 4, from an X terminal, every period T1 longer than the period T2, while outputting a pulse signal as shown in a chart (d) of FIG. 4, from a Y terminal, every period nT1 which is n times the period T1 (herein, n is a integral number). Additionally, in the present illustrative embodiment, it is assumed that "n" is 2 and thus the pulse signal is output from the Y terminal of the counter B 22 every period 2×T1.

The X terminal and Y terminal of the counter B 22 are connected to the set terminal S of the flip-flop FF2 through the switch 23. In a case where the output Q of the flip-flop FF3 is at a high level, the switch 23 connects the X terminal of the counter B 22 to the set terminal S of the flip-flop FF2, and in a case where the output Q of the flip-flop FF3 is at a low level, the switch 23 connects the Y terminal of the counter B 22 to the set terminal S of the flip-flop FF3. Therefore, in the case where the output Q of the flip-flop FF3 is at the high level, the flip-flop FF2 is set every period T1, and then is reset in the period T2. Also, in the case where the output Q of the flip-flop FF3 is at the low level, the flip-flop FF2 is set every period nT1, and then is reset in the period T2.

The output terminal Q of the flip-flop FF2 is connected to the other input terminal of the NOR circuit NOR2. Therefore, in a case where the COMP-voltage is lower than the variable voltage Vref2, and the output of the comparator CP1 is at the low level, the output Q of the flip-flop FF2 becomes a mask signal for determining oscillation periods of the switching device Q1, such that the drive (DRV) signal is generated only when the flip-flop FF2 is set such that the output becomes the high level.

Also, the counter B 22 counts a delay period T3 (several tens mS to several hundreds mS) longer than the period nT1, based on the pulse signal from the counter A 21, and when the delay period T3 elapses, the counter B 22 sets the flip-flop FF3. The count of the delay period T3 in the counter B 22, and the flip-flop FF3 are reset when the output of the comparator CP1 is at the high level. Therefore, in a case where the delay period T3 elapses in a state where the COMP-voltage is lower than the variable voltage Vref2, the flip-flop FF3 is set.

Further, the output terminal Q of the flip-flop FF3 is connected to the variable voltage Vref2. In a case where the flip-flop FF3 is set such that the output Q becomes the high level, the variable voltage Vref2 is switched to COMP1, and in a case where the output Q of the flip-flop FF3 becomes the low level, the variable voltage Vref2 is switched to COMP2 higher than COMP1.

Subsequently, an intermittent oscillation operation of the switching power-supply device of the present illustrative embodiment will be described in detail with reference to FIG. 5.

In the switching power-supply device of the present illustrative embodiment, during a normal load, the COMP-voltage becomes equal to or higher than the variable voltage Vref2, a normal oscillation operation (continuous oscillation operation) is performed based on the PWM clock signal of the PWM oscillation circuit 13. During this normal oscillation operation, since the output of the comparator CP1 is at the high level, the flip-flop FF3 is reset such that the output Q becomes the low level, and the variable voltage Vref2 is switched to COMP1, and the X terminal of the counter B 22 and the set terminal S of the flip-flop FF2 are connected by the switch 23.

Figure 5:
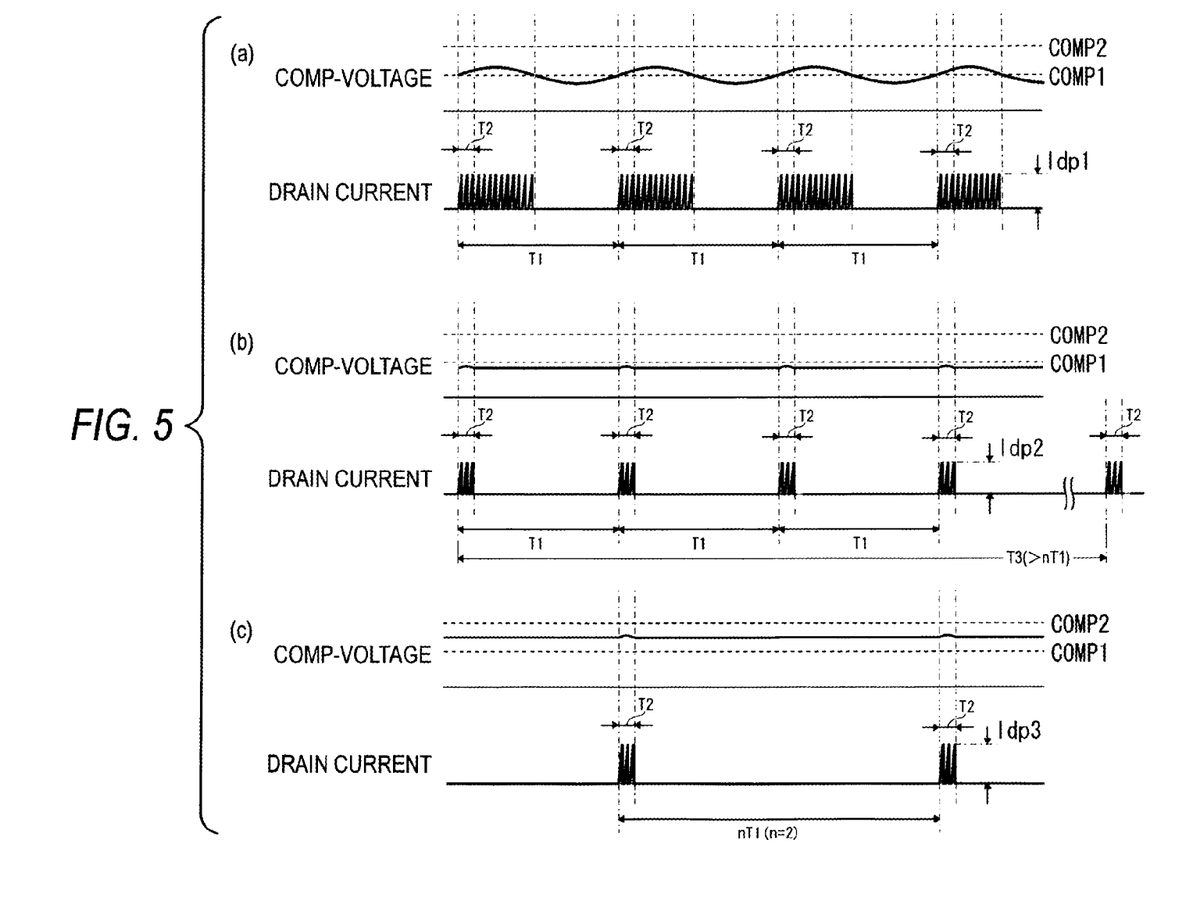
FIG. 5 is a chart illustrating signal waveforms and operation waveforms for explaining intermittent oscillation of the switching power-supply device according to this disclosure.

If a transition to a light load state or a no-load state is performed, whereby the COMP-voltage decreases to be lower than the variable voltage Vref2 (COMP1), the switching power-supply device transitions to a first intermittent oscillation operation in which an oscillation operation is performed every period T1 as shown in a chart (a) of FIG. 5. That is, if the COMP-voltage decreases to be lower than the variable voltage Vref2 (COMP1), the output of the comparator CP1 becomes the low level, whereby the output Q of the flip-flop FF2 becomes a mask signal for determining oscillation periods of the switching device Q1. In a state where the X terminal of the counter B 22 and the set terminal S of the flip-flop FF2 are connected by the switch 23, the flip-flop FF2 is set every period T1, and then is reset in the period T2. Therefore, the output of the NOR circuit NOR2 becomes the low level every period T1, and thus the oscillation operation is performed every period T1. Further, in the period T2 required for the flip-flop FF2 to be reset, the output of the NOR circuit NOR2 is maintained at the low level. Therefore, the period T2 becomes a enforced oscillation period when the oscillation operation necessarily continues. After the period T2 elapses, whether to continue oscillation is determined by the COMP-voltage. That is, after the period T2 elapses, since the flip-flop FF2 is reset such that the output Q becomes low level, if the COMP-voltage decreases to be lower than the variable voltage Vref2 (COMP1) such that the output of the comparator CP1 becomes the low level, the output of the NOR circuit NOR2 becomes the high level, whereby the oscillation is stopped. In other words, until the COMP-voltage decreases to be lower than the variable voltage Vref2 (COMP1), the oscillation is continued.

If the load further decreases such that the COMP-voltage becomes always lower than the variable voltage Vref2 (COMP1) as shown in a chart (b) of FIG. 5, a period when the oscillation is continued is only the enforced oscillation period (the period T2). Further, if the delay period T3 (several tens mS to several hundreds mS) elapses in a state where the COMP-voltage is always lower than the variable voltage Vref2 (COMP1), the flip-flop FF3 is set. If the flip-flop FF3 is set such that the output Q becomes the high level, the Y terminal of the counter B 22 and the set terminal S of the flip-flop FF2 are connected, and the variable voltage Vref2 is switched to COMP2 higher than COMP1. Therefore, the switching power-supply device transitions to a second intermittent oscillation operation in which the oscillation operation is performed every period nT1 as shown in a chart (c) of FIG. 5. That is, in a state where the Y terminal of the counter B 22 and the set terminal S of the flip-flop FF2 are connected by the switch 23, the flip-flop FF2 is set every period nT1, and then is reset in the period T2. Therefore, the output of the NOR circuit NOR2 becomes the low level every period of nT1, whereby the oscillation operation is performed every period of nT1. Further, in the period T2 required for the flip-flop FF2 to be reset, the output of the NOR circuit NOR2 is maintained at the low level. Therefore, the period T2 becomes an enforced oscillation period when the oscillation operation necessarily continues.

In the second intermittent oscillation operation, the cycle in which the oscillation operation is performed is n times that of the first intermittent oscillation operation. Therefore, in a case where the enforced oscillation period (the period T2) is fixed, a period when energy is transmitted to the secondary side becomes shorter, whereby the feedback signal rises and the COMP-voltage rises. Therefore, in the second intermittent oscillation operation, the period in which energy is transmitted to the secondary side becomes 1/n times that of the first intermittent oscillation operation. However, since the variable voltage Vref2 is switched to COMP2 which is $\sqrt{n}$ times higher than COMP1, the peak value of the drain current of the switching device Q1 increases $\sqrt{n}$ times. Therefore, in the enforced oscillation period (the period T2), energy to be transmitted to the secondary side becomes n times, and thus it is possible to achieve an energy balance. Also, energy to be transmitted to the secondary side depends on a square of the peak value of the drain current (the OCP voltage). Therefore, it is preferable to set COMP2 to or more times COMP1, and hysteresis is formed to prevent the switching power-supply device from immediately returning to the first intermittent oscillation operation.

During the second intermittent oscillation operation, if the load changes such that energy of the secondary side is consumed. As a result, when the feedback signal rises and the COMP-voltage becomes equal to or higher than COMP2, the output of the comparator CP1 becomes the high level, whereby the flip-flop FF3 is reset. If the flip-flop FF3 is reset such that the output Q becomes the low level, the X terminal of the counter B 22 and the set terminal S of the flip-flop FF2 are connected, and the variable voltage Vref2 is switched to COMP1. Therefore, a slight change in the load can cause the switching power-supply device to return to the first intermittent oscillation operation having a short intermittent cycle.

Subsequently, it will be described in detail that the conditions for transitions to the first intermittent oscillation operation and the second intermittent oscillation operation according to input power Pin which is energy to be transmitted to the secondary side.

The peak value of the drain current, the inductance of the transformer T, and the oscillation frequency of the PWM clock signal are represented by Idp, T, and f, respectively. The input power Pin can be expressed by the following equation.

$$Pin=(1/2) \times L \times Idp^2 \times f$$

Therefore, if the current peak of the drain current is represented by Idp1 as shown in a chart (a) of FIG. 5, input power Pin1 when the normal continuous oscillation operation is transitioned to the first intermittent oscillation operation can be expressed by the following equation.

$$Pin1=(1/2) \times L \times Idp1^2 \times f$$

Next, since input power Pin2 when the first intermittent oscillation operation is transitioned to the second intermittent oscillation operation needs to continue a state equal to or lower than energy to be transmitted to the secondary side in the enforced oscillation period (the period T2), if the current peak of the drain current is represented by Idp2 as shown in a chart (b) of FIG. 5, the input power Pin2 can be expressed by the following equation.

$$Pin2 \leq (1/2) \times L \times Idp2^2 \times f \times T2/T1$$

Also, since input power Pin3 when the second intermittent oscillation operation is transitioned to the first intermittent oscillation operation needs to become equal to or higher than energy to be transmitted to the secondary side in the enforced oscillation period (the period T2), if the current peak of the drain current is represented by Idp3 as shown in a chart (c) of FIG. 5, the input power Pin3 can be expressed by the following equation.

$$Pin3 \geq (1/2) \times L \times Idp3^2 \times f \times T2/(nT1)$$

Meanwhile, it is required to transition that a following condition for a transition from the second intermittent oscillation operation to the first intermittent oscillation operation is satisfied.

$$n \leq (Idp2)^2/(Idp3)^2$$

In a case where this condition is not satisfied, there is a possibility that the first intermittent oscillation operation and the second intermittent oscillation operation are mixed.

Here, in the present illustrative embodiment, assuming that a subcritical condition is satisfied, and thus f=100 kHz, L=1 mH, n=2, T1=1 ms, T2=100 μS. Further, in case of Idp1=0.2 A, Idp2=0.2 A, and Idp3=0.28 A, the input power Pin1, the input power Pin2, and the input power Pin3 become 2 W, 0.2 W, and 0.4 W, respectively, and thus hysteresis of the input power Pin is formed.

Figure 7:
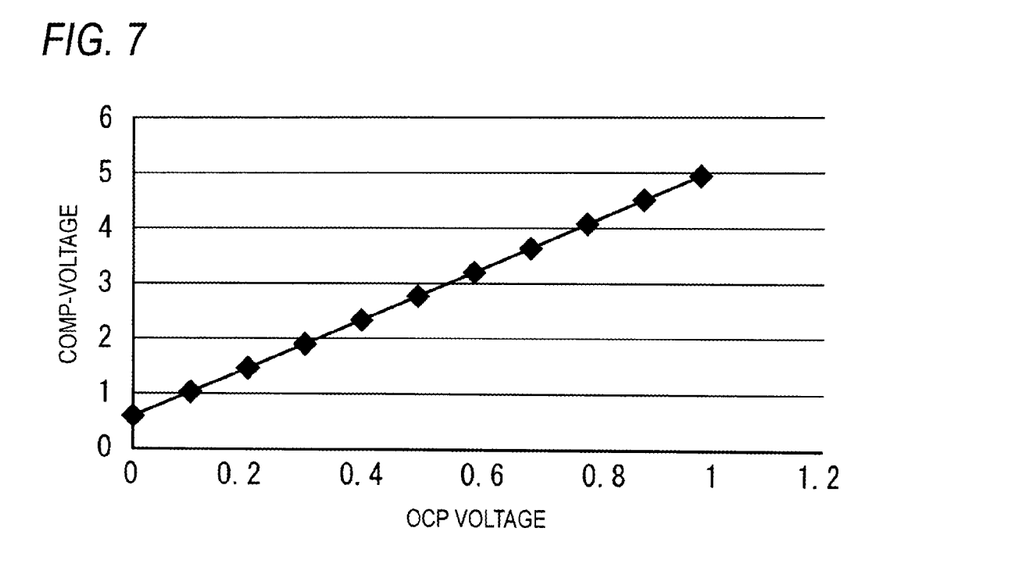
FIG. 7 is a graph illustrating the relation between OCP voltage and COMP-voltage.

Also, the OCP voltage (the current peak of the drain current is represented by Idp) and the COMP-voltage are proportional to each other as shown in FIG. 7.

Figure 6:
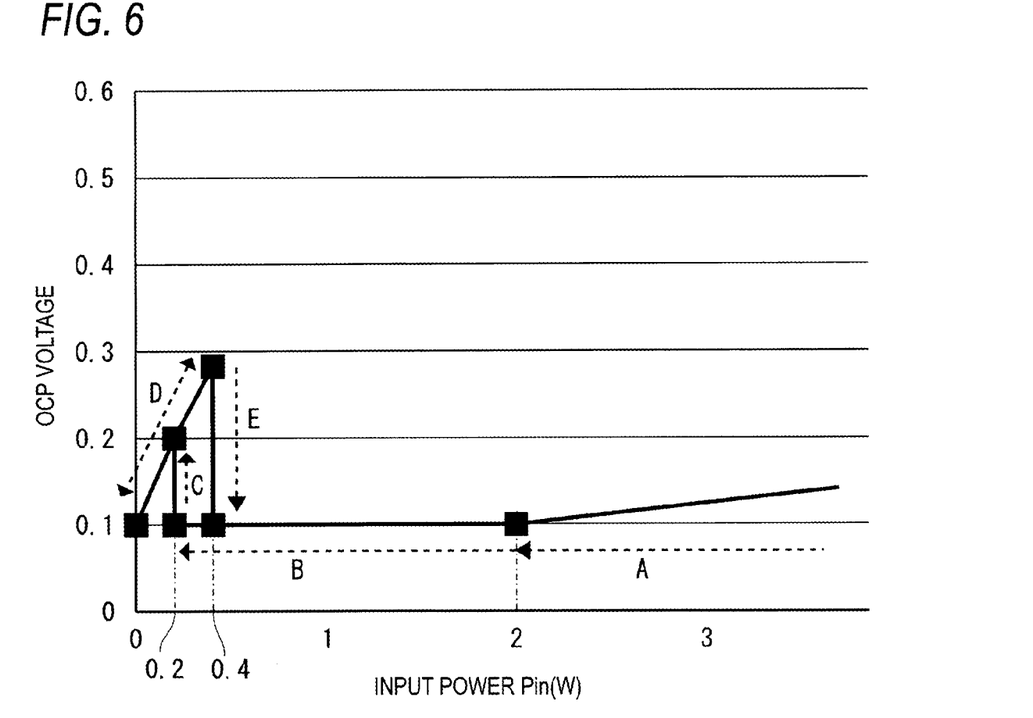
FIG. 6 is a graph illustrating the relation between input power and OCP voltage.

As shown by an arrow "A" in FIG. 6, if the load decreases and thus the input power Pin decreases, the OCP voltage proportional to the COMP-voltage also decreases. Thereafter, the input power Pin reaches the input power Pin1 of 2 W, a transition to the first intermittent oscillation operation is performed. As shown by an arrow "B", after the transition to the first intermittent oscillation operation is performed, and the load further decreases and thus the input power Pin decreases, the OCP voltage unlikely changes and the oscillation period becomes shorter. Thereafter, as shown by an arrow "C", if the input power Pin reaches the input power Pin2 of 0.2 W, a transition to the second intermittent oscillation operation is performed. As a result, the OCP voltage rises.

As shown by an arrow "D" in FIG. 6, after the transition to the second intermittent oscillation operation is performed, since the intervals of the oscillation operation become long, a slight change in the load, that is, a slight change in the input power Pin causes the OCP voltage to considerably change. Therefore, due to a slight change in the load, the switching power-supply device can return to the first intermittent oscillation operation. That is, as shown by an arrow "E", if the input power Pin rises and reaches the input power Pin3 of 0.4 W, a transition to the first intermittent oscillation operation is performed. As a result, the OCP voltage is lowered.

Figure 8:
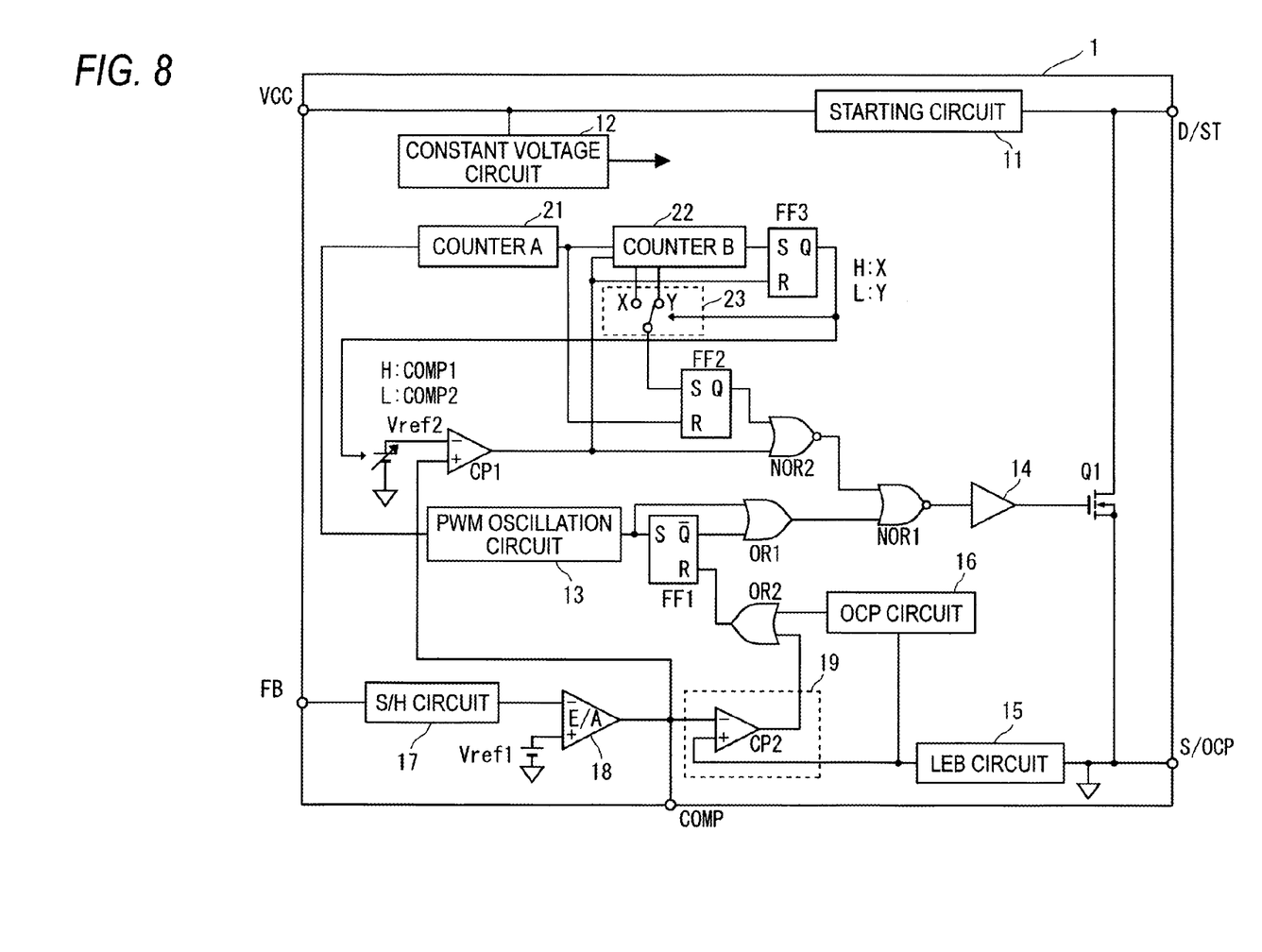
FIG. 8 is a circuit diagram illustrating another circuit configuration of the control circuit shown in FIG. 1.

Also, in the present illustrative embodiment, the control circuit 1 includes two oscillation circuits, that is, the PWM oscillation circuit 13 and the burst oscillation circuit 20. However, a common oscillation circuit may be used as the PWM oscillation circuit 13 and the burst oscillation circuit 20. For example, as shown in FIG. 8, the PWM oscillation circuit 13 may be used as the burst oscillation circuit 20.

Also, in the present illustrative embodiment, hysteresis of the input power is acquired by the voltage difference between COMP1 and COMP2 of the variable voltage Vref2 to be compared with the COMP-voltage. However, it is also possible to acquire hysteresis of the input power by changing the oscillation frequency and the time of T2 according to the COMP-voltage. That is, in a case where switching from a short intermittent cycle to a long intermittent cycle is performed, it is difficult to achieve an energy balance. However, it is possible to stabilize the operation at the switching moment by increasing the oscillation frequency or lengthening the enforced oscillation period according to the COMP-voltage. Also, during a light load or no load, the voltage of the COMP terminal is low, and thus does not affect the standby characteristic. Further, since it is possible to reduce a variation amount of an S/OCP voltage (the peak value of the drain current), it is possible to suppress a buzzing noise from being generated at the transformer due to a flux change of the transformer.

As described above, according to the present illustrative embodiment, the switching power-supply device includes: a COMP-voltage comparator circuit (the comparator CP1) that compares the COMP-voltage obtained by performing phase compensation on the feedback signal, with a first threshold voltage (COMP1 of the variable voltage Vref2) which is a threshold value; and an intermittent-oscillation control circuit (the burst oscillation circuit 20, the counter A 21, the counter B 22, the switch 23, the flip-flops FF2 and FF3, and the NOR circuits NOR1 and NOR2) that, if it is detected by the COMP-voltage comparator circuit that the COMP-voltage is lower than the first threshold voltage, stops the switching operation of the switching device Q1 and performs a transition to the first intermittent oscillation operation in which the switching device Q1 performs the switching operation every predetermined first period (every period T1). If a predetermined delay time elapses in a state where the COMP-voltage is lower than the first threshold voltage, the intermittent-oscillation control circuit performs a transition to the second intermittent oscillation operation in which the switching device Q1 performs the switching operation every second period (the period nT1) which is an integral multiple of the first period.

According to this configuration, the second intermittent oscillation operation having a long intermittent cycle is used during no load and during the standby operation, and the first intermittent oscillation operation having a short intermittent cycle is used during a light load. Therefore, it is possible to appropriately use the intermittent oscillation operations in load ranges. That is, since standby power is reduced in the second intermittent oscillation operation having the long intermittent cycle, and the dynamic characteristic is improved in the first intermittent oscillation operation having the short intermittent cycle, it is possible to achieve an excellent standby characteristic without sacrificing the dynamic characteristic. Also, a transition from the first intermittent oscillation operation having the short intermittent cycle to the second intermittent oscillation operation having the long intermittent cycle is performed after the delay period, not instantly, with hysteresis in the transition time. As a result, a transition to the second intermittent oscillation operation having the long intermittent cycle is performed only during no load or in a case where the standby power is maintained for a predetermined period. Therefore, it is possible to deal with a sudden change in the load except for during standby.

Further, according to the present illustrative embodiment, the first intermittent oscillation operation and the second intermittent oscillation operation includes the enforced oscillation period (the period T2) in which the switching device Q1 is controlled to perform the switching operation.

According to this configuration, in the second intermittent oscillation operation having the long intermittent cycle, since the switching device Q1 performs the switching operation only during the enforced oscillation period (the period T2), the switching power-supply device can return to the first intermittent oscillation operation having the short intermittent cycle, due to a slight change in the load. Accordingly, a transition to the second intermittent oscillation operation having the long intermittent cycle is performed only during no load or a light load. Therefore, it is possible to reduce switching loss without sacrificing the dynamic characteristic, and it is possible to improve the standby characteristic.

Additionally, in the first intermittent oscillation operation, the switching device is controlled to perform the switching operation not only during the enforced oscillation period.

Furthermore, according to the present illustrative embodiment, when a transition to the second intermittent oscillation operation is performed, the intermittent-oscillation control circuit switches the threshold value, which is compared with the COMP-voltage of the COMP-voltage comparator circuit, to a second threshold voltage (COMP2 of the variable voltage Vref2) higher than the first threshold voltage, and wherein if it is detected by the COMP-voltage comparator circuit that the COMP-voltage is equal to or higher than the second threshold voltage, the intermittent-oscillation control circuit performs a transition to a first intermittent oscillation operation and also switches the threshold value, which is compared with the COMP-voltage of the COMP-voltage comparator circuit, to the first threshold voltage.

According to this configuration, in a transition to the first intermittent oscillation operation or the second intermittent oscillation operation, it is possible to form hysteresis of the input power Pin.

This disclosure has been described with reference to the specific illustrative embodiment, the above described illustrative embodiment is an example. However, it is apparent that it is possible to modify the illustrative embodiment without departing from the scope of this disclosure.

What is claimed is:

1. A switching power-supply device comprising:
   a transformer that includes a primary winding, a secondary winding, and an auxiliary winding;
   a switching device that is connected in series with the primary winding;
   an oscillation circuit that causes the switching device to perform a switching operation;
   an output voltage generating circuit that generates an output voltage based on a voltage generated in the secondary winding;
   a control-circuit power-supply voltage generating circuit that generates a control-circuit power-supply voltage based on a voltage generated in the auxiliary winding; and
   a feedback control circuit that uses a pulse voltage generated in the auxiliary winding according to the switching operation of the switching device, as a feedback signal, to control the ON-width of the switching device,
   wherein the switching power-supply device is configured to generate a COMP-voltage by performing phase compensation on the feedback signal, the switching power-supply device further comprising:
   a COMP-voltage comparator circuit that compares the COMP-voltage obtained by performing phase compensation on the feedback signal, with a first threshold voltage which is a threshold value; and
   an intermittent-oscillation control circuit that, if it is detected by the COMP-voltage comparator circuit that the COMP-voltage is lower than the first threshold voltage, stops the switching operation of the switching device and performs a transition to a first intermittent oscillation operation in which the switching device performs the switching operation every predetermined first period,
   wherein if a predetermined delay period elapses in a state where the COMP-voltage is lower than the first threshold voltage, the intermittent-oscillation control circuit performs a transition to a second intermittent oscillation operation in which the switching device performs the switching operation every second period which is an integral multiple of the first period,
   wherein the COMP-voltage is proportional to a current peak of a switching current of the switching device;
   wherein, when the transition to the second intermittent oscillation operation is performed, the intermittent-oscillation control circuit switches the threshold value, which is compared with the COMP-voltage of the COMP-voltage comparator circuit, to a second threshold voltage higher than the first threshold voltage, thereby increasing a peak value of the switching current, and
   wherein if it is detected by the COMP-voltage comparator circuit that the COMP-voltage is equal to or higher than the second threshold voltage, the intermittent-oscillation control circuit performs a transition to the first intermittent oscillation operation and also switches the threshold value, which is compared with the COMP-voltage of the COMP-voltage comparator circuit, to the first threshold voltage, thereby reducing the peak value of the switching current.

2. The switching power-supply device according to claim 1,
wherein, the first intermittent oscillation operation and the second intermittent oscillation operation respectively includes an enforced oscillation period in which the switching device is controlled to perform the switching operation.

3. The switching power-supply device according to claim 2, wherein, when the transition to the second intermittent oscillation operation is performed, the intermittent-oscillation control circuit switches the threshold value, which is compared with the COMP-voltage of the COMP-voltage comparator circuit, to a second threshold voltage higher than the first threshold voltage, and
wherein if it is detected by the COMP-voltage comparator circuit that the COMP-voltage is equal to or higher than the second threshold voltage, the intermittent-oscillation control circuit performs a transition to a first intermittent oscillation operation and also switches the threshold value, which is compared with the COMP-voltage of the COMP-voltage comparator circuit, to the first threshold voltage.

4. The switching power-supply device according to claim 2,
wherein in the second intermittent oscillation operation, the switching device is controlled to perform the switching operation only during the enforced oscillation period, and
wherein in the first intermittent oscillation operation, the switching device is controlled to perform the switching operation not only during the enforced oscillation period.

5. The switching power-supply device according to claim 1, further comprising:
an error amplifier configured to output an error amplification signal obtained based on the feedback signal and a reference voltage, wherein the error amplifier further comprises an output terminal connected to a feedback phase compensation (COMP) terminal.

6. The switching power-supply device according to claim 1, further comprising a capacitor configured to perform the phase compensation on the feedback signal, wherein the capacitor is coupled to a COMP-terminal connected to the COMP-voltage comparator circuit.

* * * * *